(12) United States Patent
Löfving et al.

(10) Patent No.: US 12,301,519 B2
(45) Date of Patent: May 13, 2025

(54) APERIODIC SCHEDULING REQUEST

(71) Applicant: Telefonaktiebolaget LM Ericsson (publ), Stockholm (SE)

(72) Inventors: Per Löfving, Mölndal (SE); Pär Ankel, Nödinge (SE); Jan Lindskog, Pixbo (SE); Robert Baldemair, Solna (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 392 days.

(21) Appl. No.: 17/777,480

(22) PCT Filed: Nov. 18, 2020

(86) PCT No.: PCT/EP2020/082518
§ 371 (c)(1),
(2) Date: May 17, 2022

(87) PCT Pub. No.: WO2021/099376
PCT Pub. Date: May 27, 2021

(65) Prior Publication Data
US 2022/0407673 A1    Dec. 22, 2022

Related U.S. Application Data

(60) Provisional application No. 62/937,050, filed on Nov. 18, 2019.

(51) Int. Cl.
*H04L 5/14* (2006.01)
*H04L 1/1812* (2023.01)
(Continued)

(52) U.S. Cl.
CPC .......... *H04L 5/1469* (2013.01); *H04L 1/1812* (2013.01); *H04L 5/0053* (2013.01); *H04W 72/1268* (2013.01)

(58) Field of Classification Search
CPC ... H04L 5/1469; H04L 1/1812; H04L 5/0053; H04L 1/1829; H04L 1/1671; H04W 72/1268; H04W 72/21
See application file for complete search history.

(56) References Cited

U.S. PATENT DOCUMENTS

2018/0152961 A1\* 5/2018 Yamazaki ......... H04W 28/0278
2018/0310257 A1\* 10/2018 Papasakellariou .... H04W 72/23
2020/0280427 A1\* 9/2020 Liu ........................ H04L 5/023

FOREIGN PATENT DOCUMENTS

KR  10-2017-0070040 A    6/2017
WO     2019/054388 A1    3/2019

OTHER PUBLICATIONS

Lin, X., et. al., "5G New Radio: Unveiling the Essentials of the Next Generation Wireless Access Technology," IEEE Communications Standards Magazine, Sep. 2019 (8 pages).
(Continued)

*Primary Examiner* — Charles C Jiang
*Assistant Examiner* — Shawn D Miller
(74) *Attorney, Agent, or Firm* — Rothwell, Figg, Ernst & Manbeck, P.C.

(57) ABSTRACT

Method for a User Entity, UE, being adapted to transmit uplink data according to a NR TDD scheme, with a NR bases station, gNB, the UE being further adapted to transmit HARQ-ACK information, being an ACK or a NACK for received data on a downlink channel and a Scheduling Request, SR, may be provided comprising an indication of data or no data to be pending for transmittal on the up-link. The method comprises-establishing if HARQ-ACK info is available in a slot (203), —establishing if an SR-PUCCH is present in the slot (204), —if no SR-PUCCH present in the slot, generating (208) a SR, —appending (209) the SR to the HARQ-ACK, —transmitting (211) the SR appended to the HARQ-ACK.

19 Claims, 11 Drawing Sheets

(51) Int. Cl.
  *H04L 5/00*       (2006.01)
  *H04W 72/1268*    (2023.01)

(56) References Cited

OTHER PUBLICATIONS

International Search Report and Written Opinion issued in International Application No. PCT/EP2020/082518, dated Feb. 19, 2021 (15 pages).
Ericsson, "SR ID for multiple overlapping SR PUCCHs with UCI PUCCH", 3GPP TSG RAN WG1, R1-1805699, Sanya, China, Apr. 16-20, 2018 (5 pages).
Ericsson, "Summary of Partially Overlapped PUCCH Resources", 3GPP TSG RAN WG1 Meeting#92bis, R1-1805560, Sanya, China, Apr. 16-20, 2018 (14 pages).
3GPP TS 38.213 V15.7.0 (Oct. 2019), 5G; NR; Physical layer procedures for control, Oct. 2019 (112 pages).
3GPP TS 38.212 V15.7.0 Release 15 (Oct. 2019), 5G; NR; Multiplexing and channel coding, Oct. 2019 (106 pages).
3GPP TS 38.321 V15.7.0 Release 15 (Oct. 2019), 5G, NR; Medium Access Control (MAC) protocol specification, Oct. 2019 (80 pages).
Nokia et al., "On short PUCCH", 3GPP TSG RAN WG1 Meeting #93, R1-1806925, Busan, Korea, May 21-25, 2018 (3 pages).

\* cited by examiner

FIG. 8Abis

FIG. 8Bbis

APERIODIC SCHEDULING REQUEST

CROSS REFERENCE TO RELATED APPLICATION(S)

This application is a 35 U.S.C. § 371 National Stage of International Patent Application No. PCT/EP2020/082518, filed Nov. 18, 2020, which claims priority to U.S. provisional application No. 62/937,050, filed on Nov. 18, 2019. The above identified applications are incorporated by this reference.

TECHNICAL FIELD

The present invention is directed to methods and apparatuses involving signalling between nodes. More particularly, the invention relates to analogue beamforming, ABF, used in 5G, New Radio, NR, and more specifically to mechanisms for transmitting scheduling requests from the User entity, UE, side to the network, g-NodeB, gNB, side.

BACKGROUND

A short overview of the physical layer in 5G New radio system has been given in "5G New Radio: Unveiling the Essentials of the Next Generation Wireless Access Technology", Xingqin Lin et al., Ericsson, June 2018.

Figure 1:
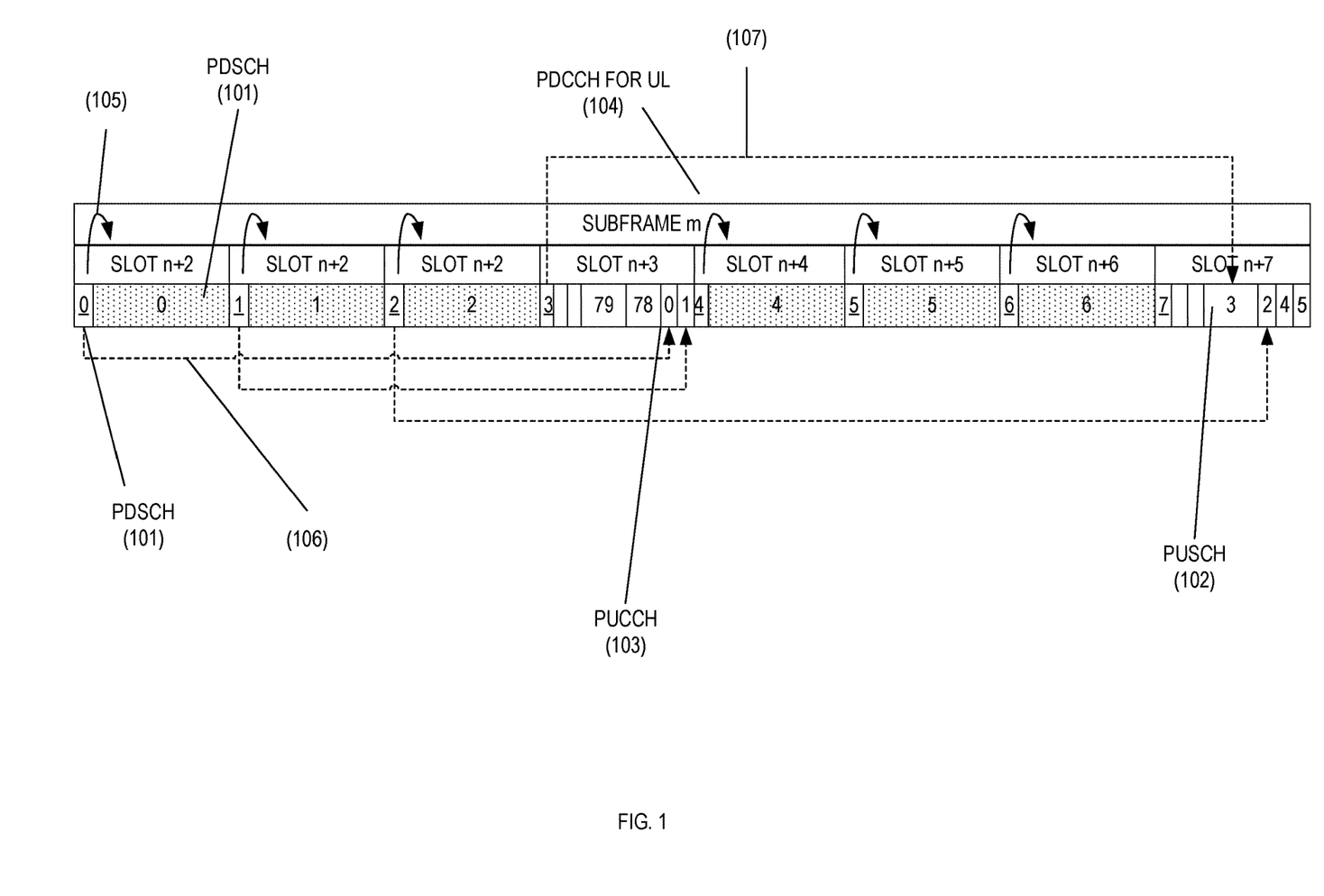
FIG. 1 shows a known 5 G TDD transmission scheme.

In FIG. 1, the concept of TDD for a 3/1 pattern when used with ABF is shown. Slot n, slot n+1 . . . slot n+7 are shown. The Following Channels are Shown:
PDSCH (Physical Downlink Shared Channel)
PDCCH (Physical Downlink Control Channel) for DL (Downlink)
PDCCH for UL (Uplink)
PUSCH (Physical Uplink Shared Channel)
PUCCH (Physical Uplink Control Channel)

Slot n represents a Downlink, DL, slot where UE when decoding the PDCCH (100) will receive DL data in PDSCH (101) and where UE will report feedback of the decoded result (ACK or NACK) in PUCCH (103). Field (105) illustrates that PDCCH will contain a field representing where PDSCH data will be received and (106) illustrates that PDCCH will contain a second field controlling when PUCCH (103) will be transmitted. Slots n, n+1, n+2, n+4, n+5, n+6, represent DL slots, and slot n+3 and n+7 represents Uplink, UL, slots. PDCCH in slot n+3 comprise a PDCCH that represents an UL slot transmission. The PDCCH will contain a delay field (107) which indicates when the PUSCH (102) transmission will start in slot n+7.

If we now for the figure above focus on ABF we can see that in slot n the beam will point at a certain direction towards the UE where the PDCCH (100) and PDSCH (101) are aimed for, whilst in slot n+1 the beam may be in the same direction or other direction dependent on which UE data is aimed for in that slot, and the same goes for slot n+2.

In slot n+3 the beam will first be set against the UE which may send data UL in PUSCH (102) and then (possibly) switch direction to the 'yellow' part in slot n+3 to receive data from the UE that was scheduled transmission at this slot (not seen in figure). Moreover, in PUCCH symbols denoted '0', '1' and '2' the beam will be set to receive PUCCH data from slot n, n+1 and n+2. If these slots represent data from different UE the beam will be changed between the PUCCH symbols.

Scheduling requests can also be sent in a configured periodic SR (denoted SR-PUCCH) as described in the reference above (case b).

chapter 9.2.4 in 3GPP 28.213 V15.7.0 (2019-09) states:
"A UE is configured by higher layer parameter SchedulingRequestResourceConfig a set of configurations for SR transmission in a PUCCH using either PUCCH format 0 or PUCCH format 1." Scheduling requests can be sent in PUCCH (103) response—in that when a UE reports its ACK or NACK it can also include an SR=1 or 0 into the message (case a).

Chapter 9.2 in 3GPP 38.213 V15.7.0 (2019-09) states:
"UCI bits include HARQ-ACK information bits, if any, SR information bit, if any, and CSI bits, if any."
Instead of transmitting the SR bit (1 or 0) in the periodic SR the UE will append the SR bit in the ACK/NACK message."
More exactly the above reference specifies:
"If a UE would transmit a PUCCH with O_ACK HARQ-A K information bits in a resource using PUCCH format 2 or PUCCH format or PUCCH format 4 in a slot, as described in subclause 9.2.3, [log 2(K+1)] bits representing a negative or positive SR, in ascending order of the values of schedulingRequestResourceId are appended to the HARQACK information bits and the UE transmits the combined $O\_UCI = O\_ACK + [\log_2(K+1)]$ UCI bits in a PUCCH using a resource with PUCCH format 2 or PUCCH format 3 or PUCCH format 4 that the UE determines as described in Subclauses 9.2.1 and 9.2.3. An all-zero value for the $[\log_2(K+1)]$ bits represents a negative SR value across all K SRs."

A prerequisite (can be denoted [preReq]) for (case a) to occur is that (case b) occurs in the same time.

Hence, A UE will never transmit the SR bit in periodic SR if it has SR=0, but if case a and case b occurs the UE is forced to send the SR content whatever the value is 0 or 1.

The prerequisite [preReq] above is stated in 3GPP 38.213 referred to above.

Chapter 9.2.5.1 states:
"UE procedure for multiplexing HARQ-ACK or CSI and SR in a PUCCH.
In the following, a UE is configured to transmit K PUCCHs for respective K SRs in a slot, as determined by a set of schedulingRequestResourceId, with SR transmission occa-sions that would overlap with a transmission of a PUCCH with HARQ-ACK information from the UE in the slot or with a transmission of a PUCCH with CSI report(s) from the UE in the slot."

For example: Assume that the configured periodic SR occurs every 40'th slot. If now the gNB sends downlink data to UE so that the ACK or NACK will be sent in the same slot as the periodic SR occurs in—AND—that the periodic SR-PUCCH overlaps in time when the ACK-NACK PUCCHs start symbol occurs in time—THEN—the SR (either 0 or 1) will be merged into the ACK-NACK message.

As an alternative a Buffer Status Report can be sent in a PUSCH (102) transmission. Since the BSR contains a better representation of the UE amount of pending data to send that outper-forms the single bit representation that the scheduling request is capable of and when a BSR is sent the SR does not need to be sent (case c).

Chapter 6.2.1 in 3GPP 38.321 V15.7.0 (2019-09) shows the PDU format for BSR—being either Short BSR or Long BSR.

Also described in the referenced application, a scheduling request can also be sent in a ran-dom-access opportunity. More exactly, the UE will use that if no periodic SR opportunities are configured (case d).

PDCCH can be of different kinds. See 3GPP 38.212 V15.7.0 (2019-09), chapter 7.3.1. For PUSCH data transmission PDCCH format 0_1 is used. Within that format the following exists as stated in 3GPP UL-SCH indicator—1 bit. A value of "1" indicates UL-SCH shall be transmitted on the PUSCH and a value of "0" indicates UL-SCH shall not be transmitted on the PUSCH. A UE is not expected to receive a DCI format 0_1 with UL-SCH indicator of "0" and CSI request of all zero(s).

The above 'UL-SCH indicator' allows for transmission of CSI data which can be seen as a form of layer 1 control information. With the flag set to "0" the gNB will not expect any UL-SCH data to be received.

A HARQ protocol is used between gNB and UE. The details are specified in 3GPP TS 38.321 chapter 5.3.2. The purpose of the HARQ protocol is to recover from PDU decode failures in both directions by sending feedback (ACK/NACK) from receiver to transmitting side allowing for retransmission.

Provided in HARQ protocol is an "New data indicator", NDI, flag as described in e.g. DCI format 0_1-1 bit.

The NDI will inform the UE that it shall:
[when NDI was toggled]: Initiate a PUSCH transmission with new data for the current HARQ process ID.
[when NDI was not toggled]: Perform a PUSCH retransmission for the current HARQ process ID, meaning that gNB failed to decode data from previous transmissions. ('Was toggled' refer to the case when previous received NDI was either '0' and new NDI is decoded as '1' or vice versa.) UE will hold previous data sent in its HARQ buffer for each process id until it recognizes a toggled NDI.

Exceptions to the above simple rules when UE can consider NDI as 'has been toggled' are described in 38.321. The meaning of the word 'has been toggled' is that whatsoever value NDI has the UE shall proceed as if the NDI 'was toggled'.

SUMMARY

It is a first object to set forth a methods and apparatuses for providing improved scheduling mechanisms and apparatuses for NR.

This object has been solved by at least one of the following methods:

Method for a User Entity, UE, being adapted to transmit uplink data according to a NR Time Division Duplex, TDD, scheme, with a New Radio, NR, base station, gNB, the UE being further adapted to transmit a Hybrid Automatic Repeat Request-Acknowledgement, HARQ-ACK, information, being an acknowledge, ACK, or a not-acknowledge, NACK, for received data on a downlink channel and being adapted for transmitting a Scheduling Request, SR, comprising an indication of data or no data to be pending for transmittal on the uplink, the method comprising:
 establishing if HARQ-ACK info on HARQ-ACK PUCCH is available in a slot,
 establishing if an SR-Physical Uplink Control Channel, SR-PUCCH, is present in the slot (204),
 if no SR-PUCCH present in the slot, generating a SR,
 appending the SR to the HARQ-ACK,
 transmitting the SR appended to the HARQ-ACK.

The object has also been achieved by a:
Method for a User Entity, UE, being adapted to transmit uplink data according to a NR Time Division Duplex, TDD, scheme, with a New Radio, NR, base station, gNB, the UE being further adapted to transmit Hybrid Automatic Repeat Request-Acknowledgement, HARQ-ACK, information, being an ACK or a NACK for received data on a downlink channel, in which the UE is not configured with Signalling request, SR,—Physical Uplink Control Channel, PUCCH, resources, the method comprising:
 establishing if PDCCH is successfully decoded, and subsequently,
 establishing if HARQ-ACK info on HARQ-ACK PUCCH is available in a slot,
 generating a SR,
 appending the SR to the HARQ-ACK,
 transmitting the SR appended to the HARQ-ACK.

There is moreover provided for achieving the above object:

A user Entity, UE, being adapted to transmit uplink data according to a NR Time Division Duplex, TDD, scheme, with a New Radio, NR, base station, gNB, the UE being further adapted to transmit a Hybrid Automatic Repeat Request-Acknowledgement, HARQ-ACK, information, being an acknowledge, ACK, or a not-acknowledge, NACK, for received data on a downlink channel and being adapted for transmitting a Scheduling Request, SR, comprising an indication of data or no data to be pending for transmittal on the uplink, the user entity being adapted for
 establishing if HARQ-ACK info on HARQ-ACK PUCCH is available in a slot,
 establishing if an SR-Physical Uplink Control Channel, SR-PUCCH, is present in the slot,
 if no SR-PUCCH present in the slot, generating a SR,
 appending the SR to the HARQ-ACK,
 transmitting the SR appended to the HARQ-ACK.

User entity for a User Entity, UE, being adapted to transmit uplink data according to a NR Time Division Duplex, TDD, scheme, with a New Radio, NR, base station, gNB, the UE being further adapted to transmit Hybrid Automatic Repeat Request-Acknowledgement, HARQ-ACK, information, being an ACK or a NACK for received data on a downlink channel, in which the UE is not configured with Signalling request, SR,—Physical Uplink Control Channel, PUCCH, resources, the user entity being further adapted to
 establishing if PDCCH is successfully decoded, and subsequently
 establishing if HARQ-ACK info on HARQ-ACK PUCCH is available in a slot,
 generating a SR,
 appending the SR to the HARQ-ACK,
 transmitting the SR appended to the HARQ-ACK.

Further advantages will appear from the detailed description and the drawings.

DETAILED DESCRIPTION

As is known in the art, in NR a resource grid is provided comprising several subcarriers in the frequency dimension and slots in the time dimension. Each slot has 14 symbols. A resource element, RE, in the resource grid occupies one subcarrier in frequency and one OFDM symbol in time.

One Resource Block, RB,—herein referred to as Physical Resource Block, PRB,—consist of 12 consecutive subcarriers. Reference is made to FIG. 1 of Lin et al. mentioned above.

A slot has 14 symbols. In each symbol, for each symbol position, there may be 66 PRB's representing 100 MHz of spectrum. Certain channels—like SR-PUCCH that only serves to signal one single bit only needs 1 PRB and 1 symbol. An SR-PUCCH can be placed anywhere on the 64 PRB's—say at PRB #13—or #35.

At the same symbol (position #)—assuming Digital Beam Forming—one could transmit another SR-PUCCH—at say PRB #2.

But certain channels (may) require more than 1 symbol because of bandwidth needs. For example, HARQ-ACK info needs more when one shall transmit more ACK's or NACK's. By example, for up to 8 ACK/NACK one symbol is used (on a PRB)—but for 9-16 ACK/NACK 2 symbols are used. In systems, there could be a gain of 2 dB in sending 16 bits ACK in two symbols instead of 8 bits in one symbol followed by 8 bits in the other.

A UE knows when and how to signal a HARQ-ACK PUCCH. Say at symbols #0, #1 and PRB #1 on each symbol. A UE also know where the SR-PUCCH occurs—because the UE is configured with a start symbol and slot—and a periodicity.

It should be understood that the mechanism for the UE for processing communication on the uplink can be considered as to comprise three steps. Initially, the UE is in need of or desiring to transmit control signals and data. During this step SRs and ACKs can be said to be pending in the UE. The UE is processing, this need or desire with due respect to gNB processes or rules and restrictions and also possible restrictions in the UE. Subsequently, control signalling and PUSCH data may be transmitted.

According to an embodiment of the invention the format for transmitting slots is consisting of 14 OFDM symbols, the slot containing with so-called HARQ-ACK PUCCH information, Scheduling Request, SR PUCCH. In a given slot there is a number of PRB's. The HARQ-ACK information may involve a HARQ acknowledge, ACK, or a HARQ not acknowledge, NACK. Concerning the first symbol, it is possible to convey both a single information element such as a SR being 0 or 1. It is also possible to convey a HARQ-NACK information, that is either an ACK or a NACK. Moreover, concerning the first symbol, combined information of SR and HARQ-ACK can be transmitted. Here, SR can be 1 or 0.

Figure 3:
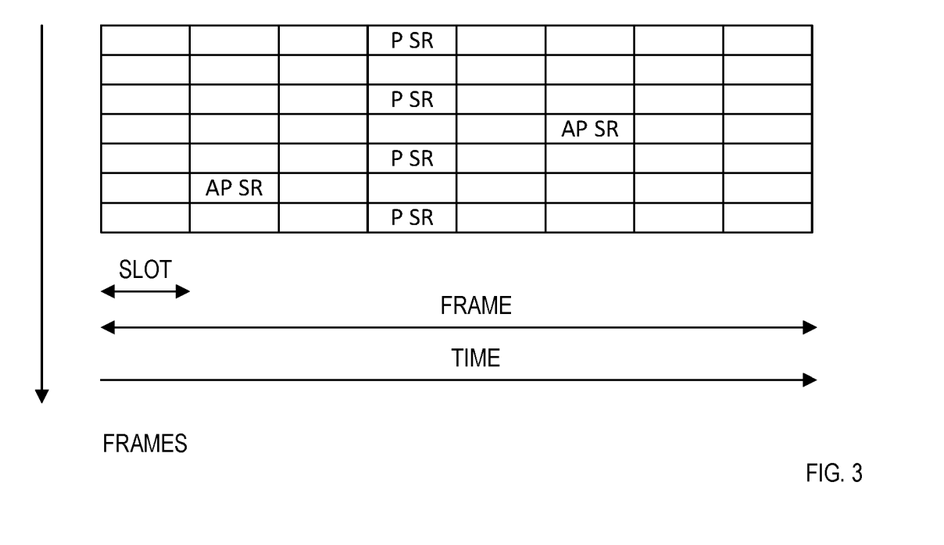
FIG. 3 shows a TDD scheme according to the invention.

In FIG. 3, the legacy 8 slot TDD frame pattern is shown whereby frames are repeated in time. SR may be transmitted in a periodic, P, manner or in an aperiodic manner, AP. Periodic SR is today required in 3GPP and it is deemed simple for the UE to use. However, if more than one UE utilise the same point in time when these P SR occurs, it is problematic to implement by ABF if the UE's are spatially separated.

Figure 4:
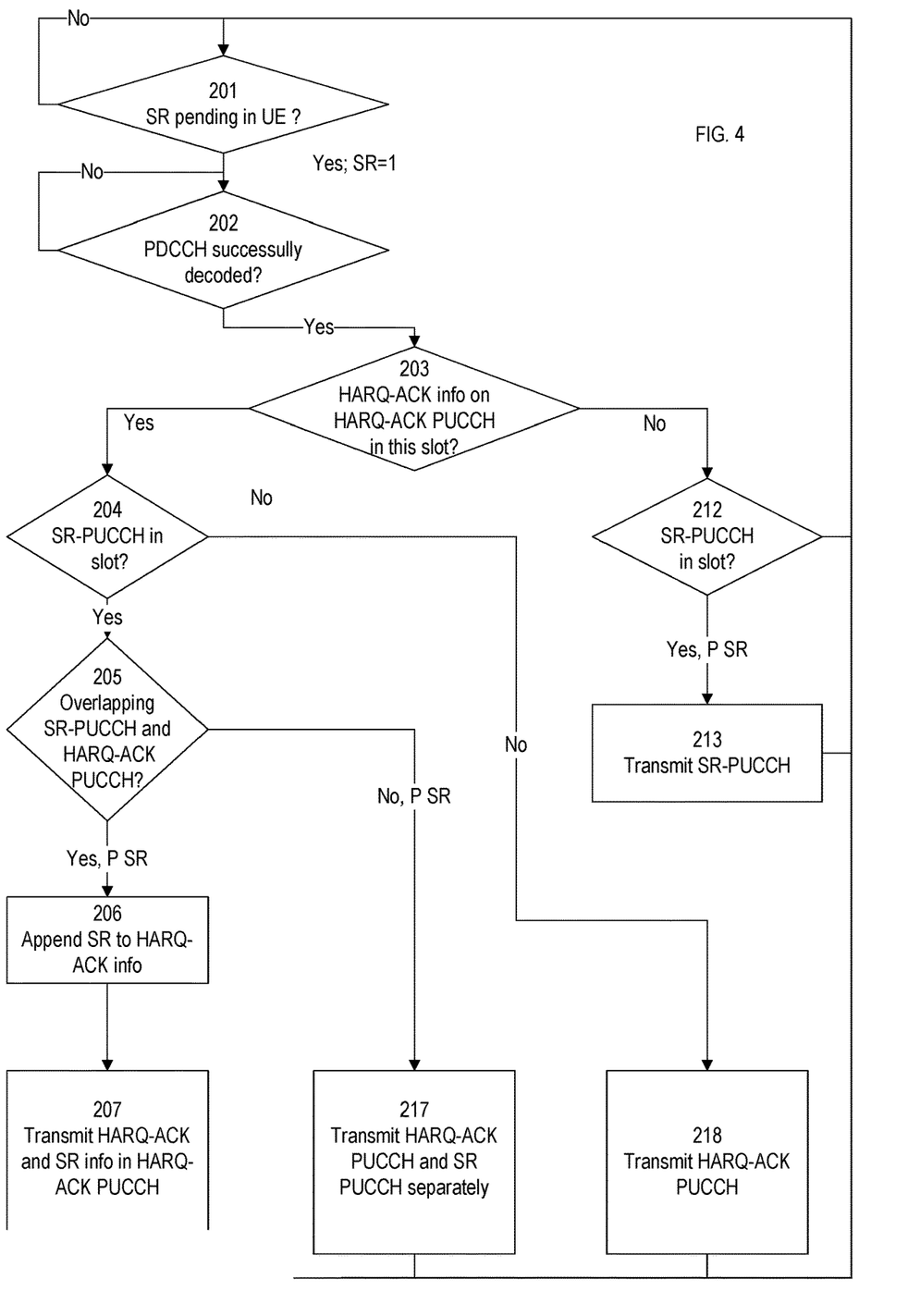
FIG. 4 shows non-public reference example for a UE process.

FIG. 4 is a flowchart concerning a non-public reference implementation, that shows the UE behaviour on a slot by slot basis.

In step 201, it is investigated if the UE has data in its buffer and is awaiting transmitting data on the uplink for a given slot.

If yes, in 202, the UE attempts decoding the PDCCH and if successful proceeds to 203.

In step 203, it is investigated whether HARQ-ACK info, that is either HARQ-acknowledge or HARQ not-acknowledge, from the UE is prepared to be transmitted in a current slot. If yes proceed to 204, if no proceed to 212. In both 204 and 212, it is investigated whether there is a periodic Signalling Request, SR-PUCCH, availability in the slot, and goes to 205, 213, respectively, if yes.

If no in 204, proceed to 218 and transmit a HARQ-ACK PUCCH.

If yes in 204, proceed to 205, in which it is resolved whether SR-PUCCH opportunity and a HARQ-ACK PUCCH opportunity is overlapping within the given slot.

If yes in 205, the UE appends, 206, a SR to HARQ-ACK info, and in 207, transmits the HARQ-ACK and SR info in HARQ-ACK PUCCH. No SR-PUCCH is transmitted.

If no in 205—no overlap—the method goes to 217 and the UE transmits HARQ-ACK PUCCH and SR PUCCH separately.

In 213, the UE transmits SR PUCCH without any HARQ info.

Figure 5:
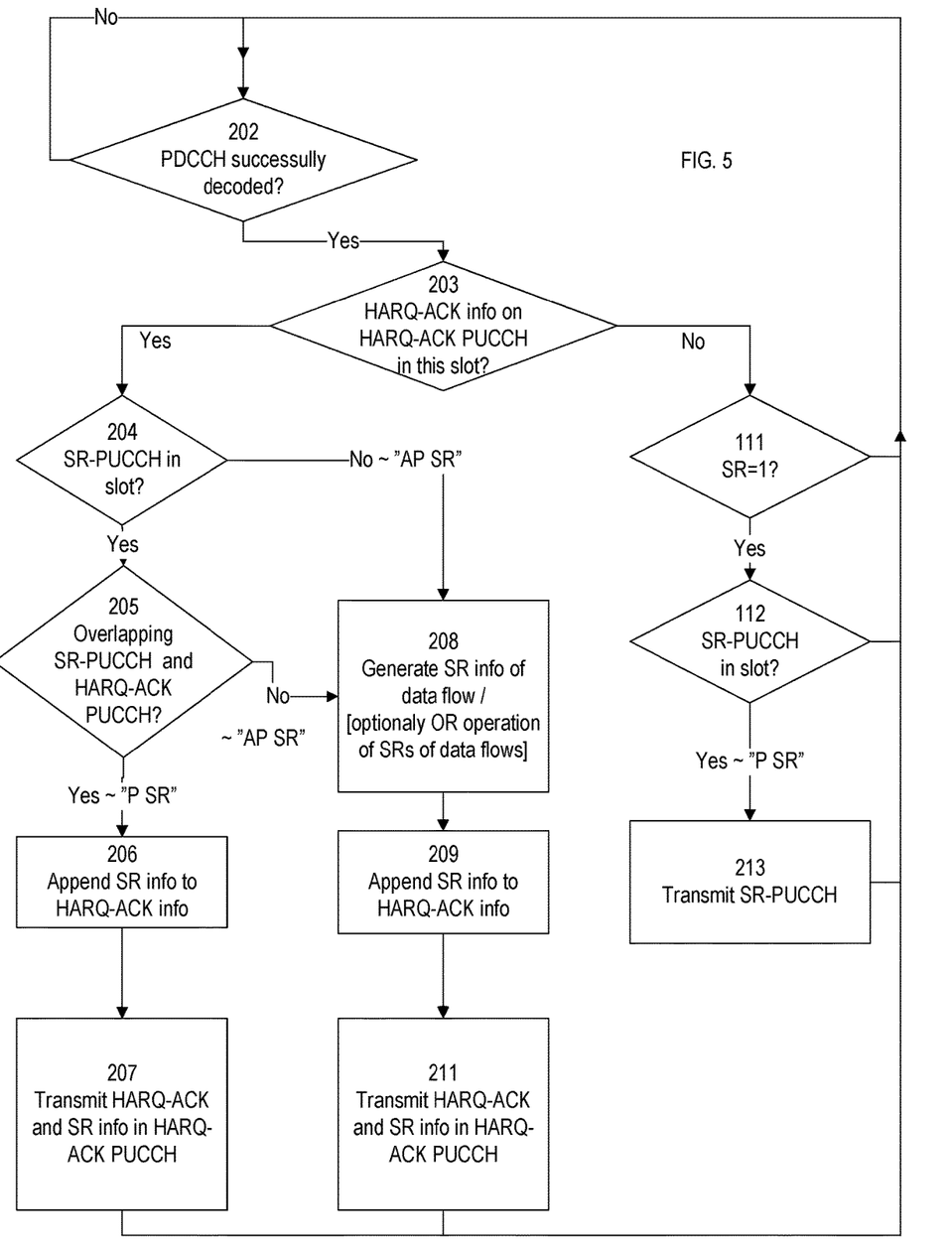
FIG. 5 shows a first embodiment of the invention.

FIG. 5 shows a first embodiment of the invention. In the following, the actions and steps have similarities with the example explained in FIG. 4, and only the differences will be explained in de-tail.

In FIG. 5, no check for SR=1, c.f. 201 in FIG. 4, needs to be performed at the beginning of the process.

In step 204—SR-PUCCH in slot?—no, the situation corresponds to a need for an aperiodic SR, AP SR, and the method proceeds to 208, otherwise to 205.

In 205 it is determined whether there is an overlapping SR-PUCCH and HARQ-ACK PUCCH. If no—there is a need for AP—and proceed to 208 and if yes—a periodic SR can be set—and proceed to 206.

In 208, an SR is generated SR=1 is set if pending data exists in the uplink buffer of the UE while SR=0 is set if no data exists. In this process, optionally more data flows for a UE may be used and the SR may optionally be generated by an OR function for the SR value of those respective flows.

The optional OR function may operate as follows for two flows of data SR1 and SR2:

| SR_1 | SR_2 | Generated SR |
|---|---|---|
| 0 | 0 | 0 |
| 0 | 1 | 1 |
| 1 | 0 | 1 |
| 1 | 1 | 1 |

In 209, the generated SR value is appended to the to the HARQ-ACK, 209, info the UE transmits this information 211.

In 206, the SR is appended to the HARQ-ACK info.

It is noted that ACK (or NACK) typically will come in a very 'aperiodic' fashion from a single UE that reflects the data transmitted to the UE. The embodiments described above, provide for such aperiodic SR transmissions.

It is moreover noted that it would be infeasible to put a periodic SR in every slot or in large pro-portion of instances—because that would waste uplink transmit resources for gNB as well as it would drain UE's battery. UE's battery will be drained due to the use of ABF where multiple of UE's can be spatially separated but may have their SR-PUCCH occurring at the same slot and symbol in the TDD scheme which causes gNB to have problem in decoding all SR-PUCCH thus causing some UE's to transmit multiple of times until gNB can decode their SR.

Figure 6:
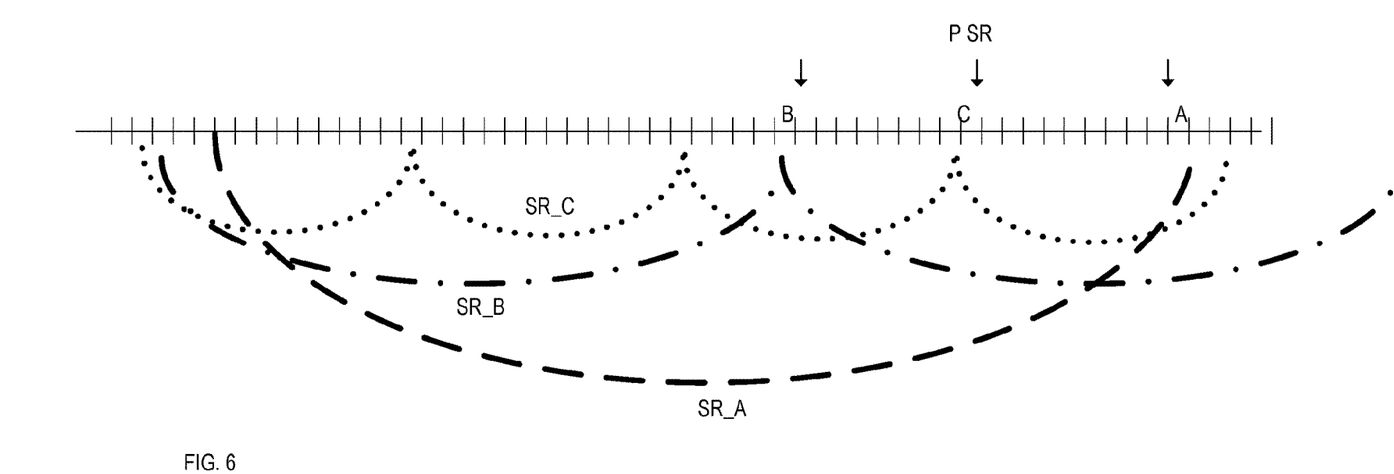
FIGS. 6 and 7 show some effects of the invention in relation to a 3GPP legacy example,
FIGS. 8A-8B, 8Abis-8Bbis, and 9A-9B
 show various implementations of embodiments of the invention relating to overlap-ping/non-overlapping SR-PUCCH and HARQ-ACK PUCCH.

In FIG. 6, the legacy pattern is shown in which three logical data flows for a UE are shown corresponding to three QoS classes, SR_A, SR_B and SR_C. Periodic SR's may be transmitted at times B, C and A corresponding to the respective data flows.

Figure 7:
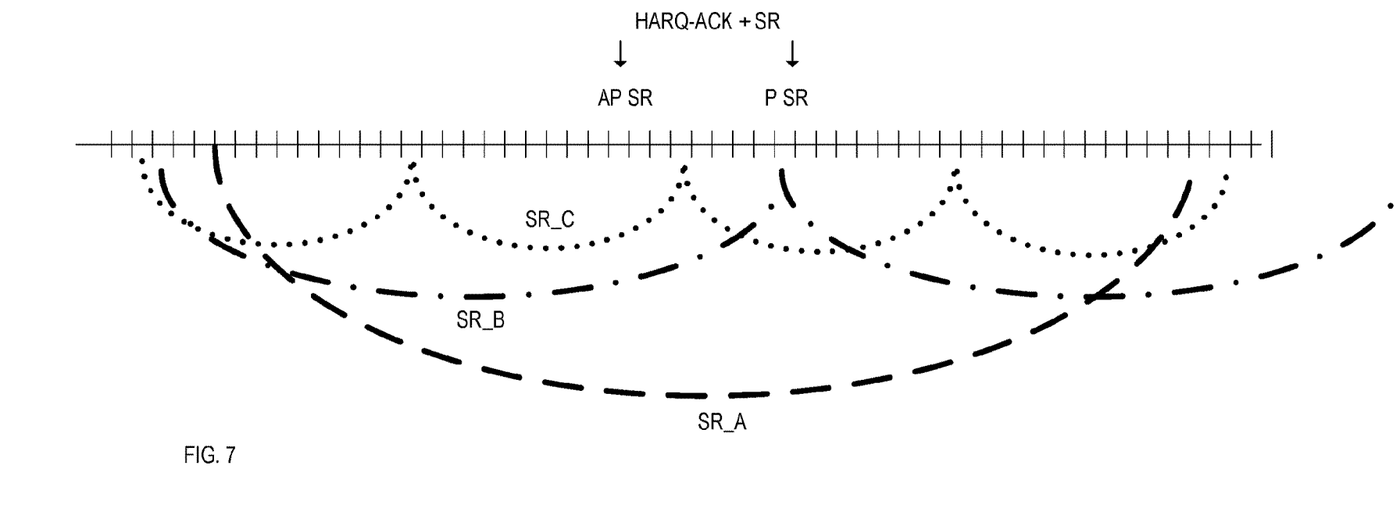

According to aspects of the invention, an aperiodic SR may be issued as appended SR to HARQ-ACK info, as an aperiodic SR, AP SR, as shown in FIG. 7. This however, does not preclude issuance of periodic SRs, P SR, at other instances.

In this embodiment, corresponding to the flow shown in FIG. 5, the SR-PUCCH is periodic in time AND the requirement that a SR multiplexing only occurs if the HARQ-ACK PUCCH overlaps in time, 205, which can be seen in FIG. 7 at 'P SR'.

Figure 8:
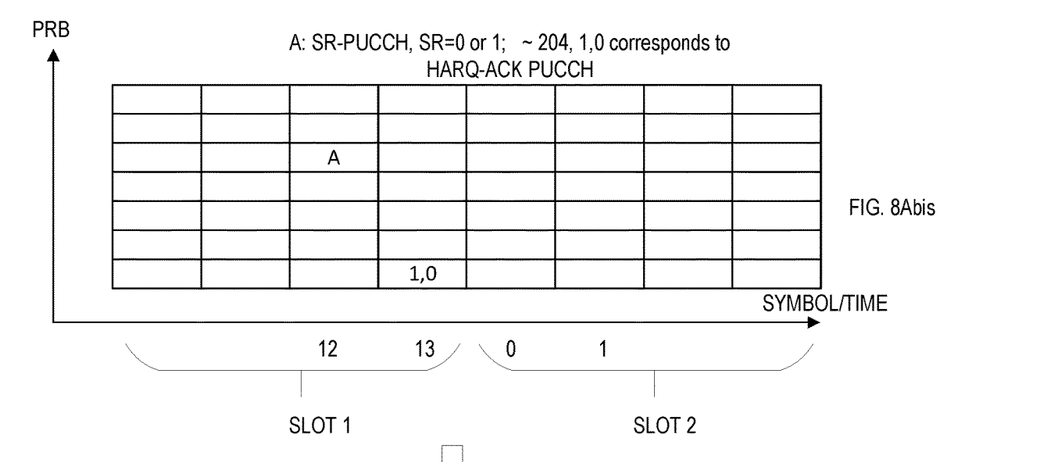
Figure 8A:
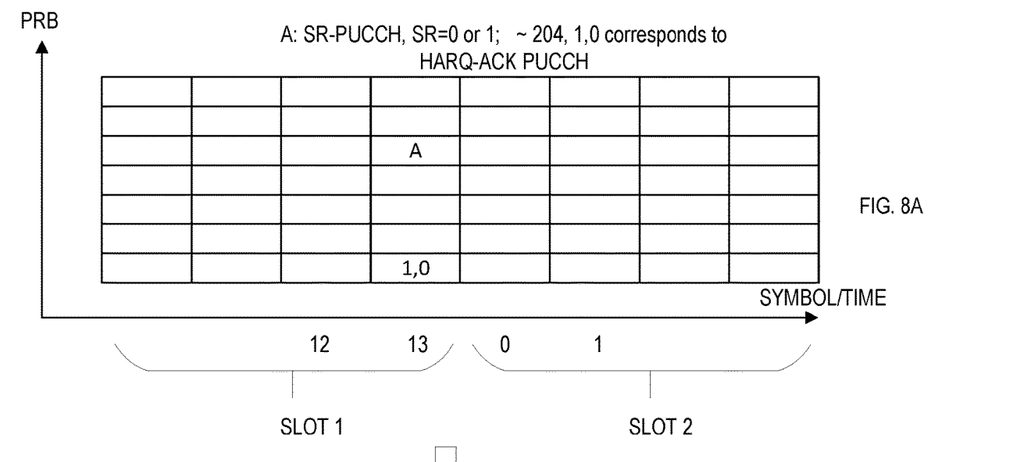
Figure 8B:
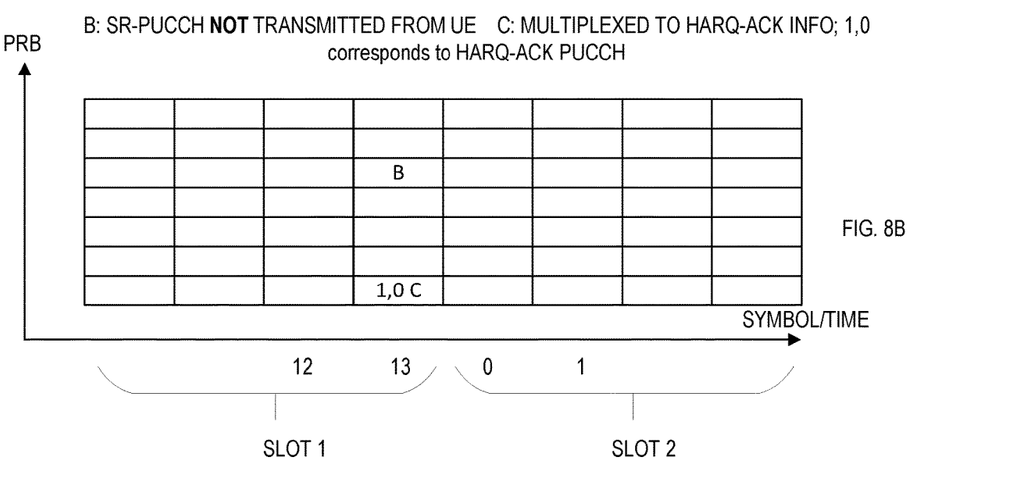

FIG. 8A, exemplary allocations of resources are indicated wherein symbols are indicated at the x-axis and PRBs at the y-axis. Two symbols are marked in slot 1-12 and 13. A slot has symbols 0 to 13. At slot 13, a single symbol aperiodic HARQ-ACK PUCCH resource (1,0) exists. At the same symbol a SR-PUCCH resource exists (A), c.f. step 204. They are overlapping, c.f. step 205 and 206, and in FIG. 8B, a multiplex of SR being 0 or 1 occurs in the UE. So, UE does not use (B) the SR-PUCCH resource (as would otherwise would have been the case in 217 if SR=1) and transmits the HARQ-ACK and SR info in the HARQ-ACK PUCCH, 207. The above corresponds to a mandatory behaviour for legacy NR UE's, that may also be utilized in present embodiments.

In FIG. 8Abis, again exemplary allocations of resources are indicated wherein symbols are indicated at the x-axis and PRBs at the y-axis. At slot 13, a single symbol aperiodic HARQ-ACK PUCCH resource (1,0) exists. At the symbol 12 a SR-PUCCH resource exists (A), c.f. step 205. They are not overlapping, c.f. steps 205 and 217, and in FIG. 8Bbis, a capable UE transmits both SR-PUCCH and HARQ-ACK PUCCH, 217 separately. SR-PUCCH is transmitted from the UE (B).

Figure 9A:
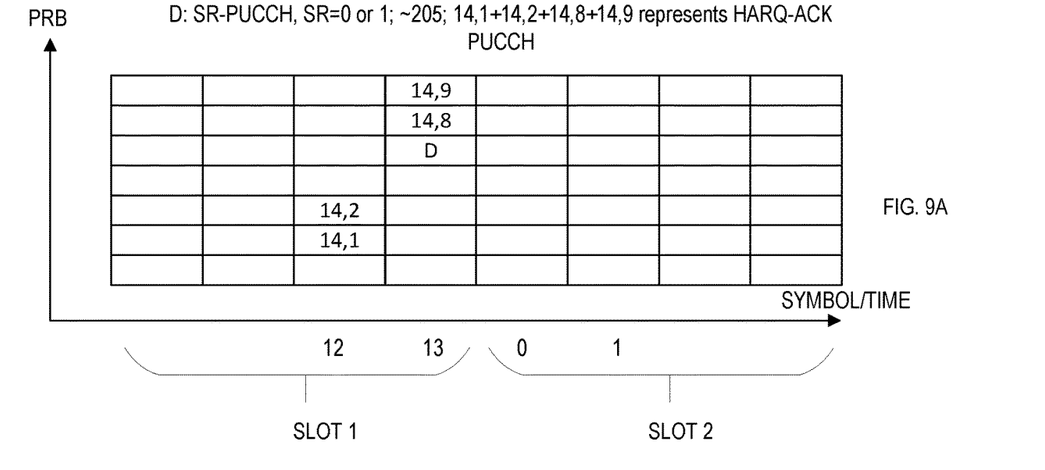
Figure 9B:
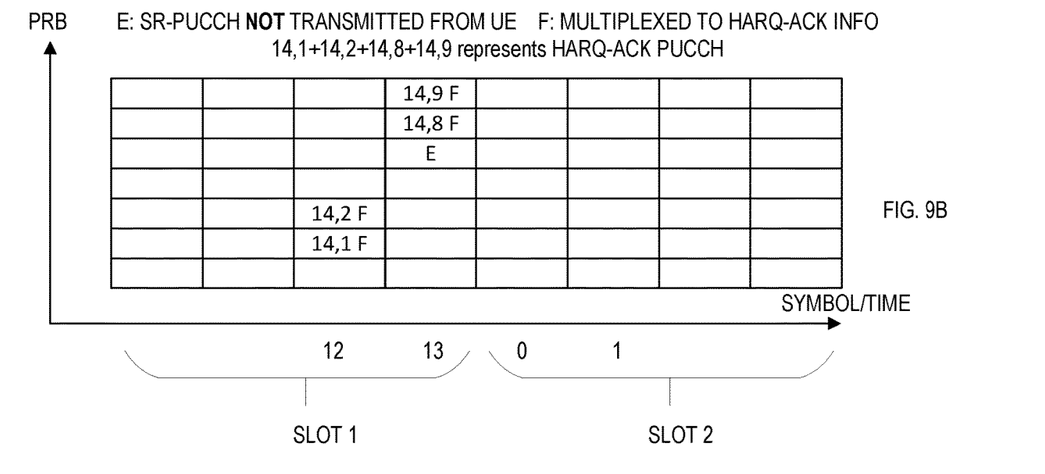

Another example of overlapping is shown in FIG. 9A. At slot 12 and 13 a "two symbol PUCCH" (14,1+14,2; 14,8+14,9 (which are exemplary PRB designations)) exists. At symbol 13, an SR-PUCCH resource exists (D), c.f. step 204. At symbol 13 another kind of overlap exists, c.f. step 205, and a multiplex of SR being 0 or 1 occurs. So, the UE does not use the SR-PUCCH resource (E), as indicated in FIG. 9B, but appends (or multiplex (F)) the SR info to the HARQ-ACK PUCCH, 206. The above is an optional legacy NR UE behaviour, that may further be utilized in present embodiments. In the last example, 2 PRB for (14,1+14,2; 14,8+14,9) are used because additional ACK NACK bits are needed. There is moreover a jump in frequency between symbol 12 and 13 which is a mechanism that improves robustness of the aperiodic PUCCH. This may also be utilized in present embodiments.

Figure 10:
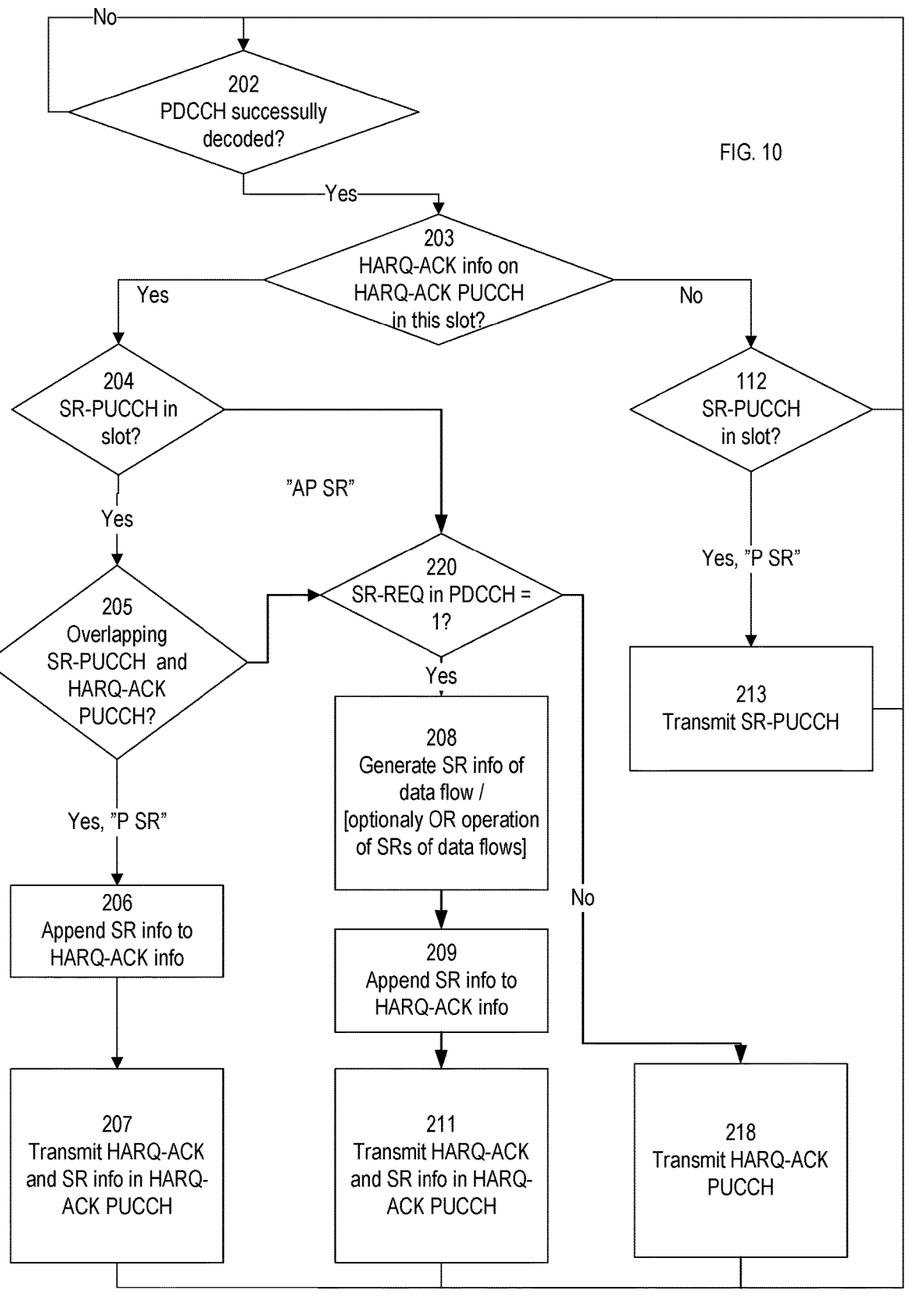
FIG. 10 shows a further embodiment according to the invention.

FIG. 10 shows a further embodiment of the invention, that shows many similarities with FIG. 5 embodiment. In this embodiment, a new field, that could be denoted SR request, SR-REQ, in PDCCH is provided. The field SR-REQ that may be 1 or 0. For further details relating to the steps having reference numbers in common with those shown on FIG. 5, reference is made to the corresponding explanation.

In this embodiment a new field in PDCCH (100) of FIG. 1, SR-REQ, will allow the gNB to control when an aperiodic SR shall occur. This allows gNB to control whether UE shall utilise a legacy HARQ-ACK PUCCH, c.f. step 218, or to multiplex SR into HARQ-ACK info, c.f. step 208.

For cases such as ftp download of larger files it may be unnecessary to provide aperiodic SR opportunities in every HARQ-ACK PUCCH that will be in use.

For cases when multiple SR's exists, c.f. FIG. 7 with SR_A, SR_B and SR_C, SR_REQ can be used by gNB to distinguish whether the aperiodic SR shall be derived from SR_A only, or SR_B only or SR_C only or an optional OR operation of SR_A, SR_B and SR_C.

It is seen that an additional checkbox 220 is provided in which SR-REQ=1. If fulfilled, the method moves to 218 and transmits the HARQ-ACK PUCCH. If not fulfilled the method proceeds to 208 and carry on the actions defined in FIG. 5 embodiment.

Figure 11:
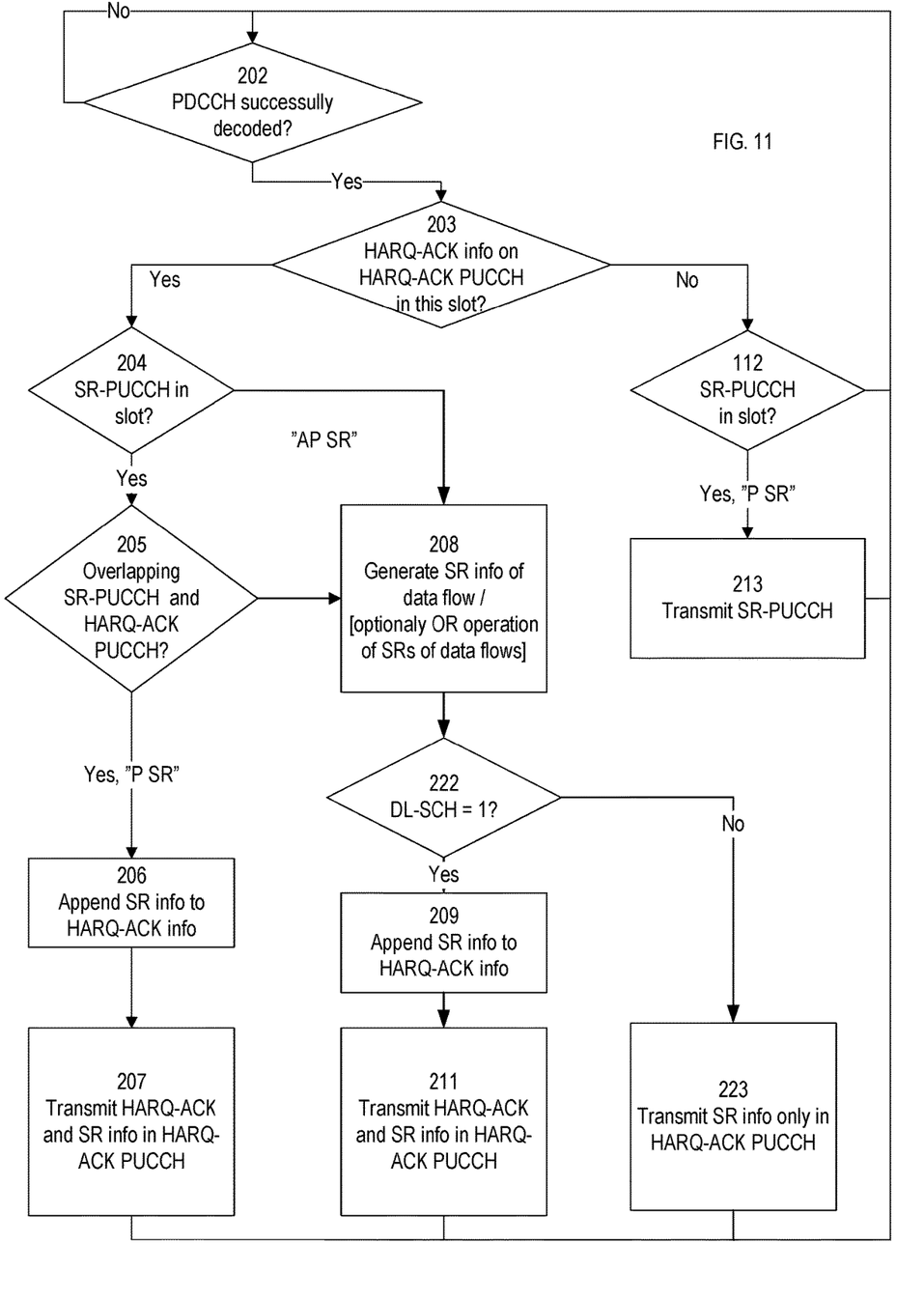
FIG. 11 shows a still further embodiment of the invention.

FIG. 11 shows a still further embodiment of the invention, in which a new field Downlink scheduling, DL-SCH,—for example a one-bit indicator—is provided in PDCCH (100), FIG. 1, step 222. For the case when there is no need to use a DL PDSCH opportunity, gNB may use the DL-SCH ability to poll a UE for its SR [e.g. setting the DL-SCH=0 (that is, no downlink data)] to be transmitted in the HARQ-ACK PUCCH resource. A UE shall interpret the DL-SCH=0 as an opportunity to transmit only the SR information without decoding the PDSCH in the HARQ-ACK PUCCH resource (which is normally meant for signalling HARQ-ACK info). A UE shall interpret the DL-SCH=1 as a DL PDSCH exists and HARQ-ACK info for such transmission shall be generated for the HARQ-ACK PUCCH resource. In step 222 there is provided a checkbox in which DL-SCH=1? is investigated. If fulfilled, the method continues with step 209.

If not fulfilled, step 223 is continued with where the SR info (0 or 1) is being transmitted in the HARQ-ACK PUCCH with any HARQ-ACK info. For further details relating to the steps having reference numbers in common with those shown on FIG. 5, reference is made to the corresponding explanation.

Figure 12:
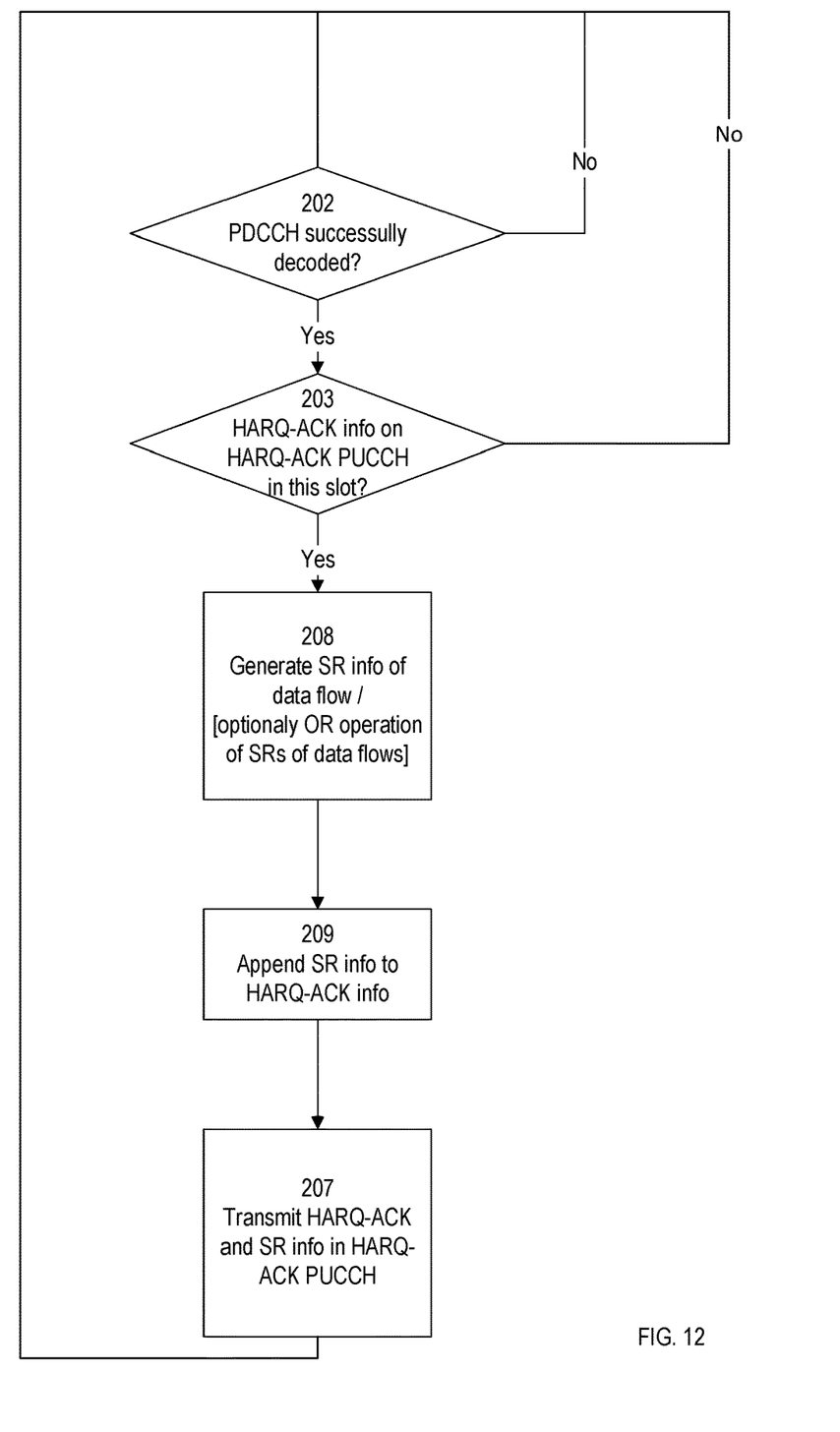
FIG. 12 shows a still further embodiment of the invention.

FIG. 12 shows a still further embodiment of the invention, in which a UE is not configured with SR-PUCCH resources. Such UE's normally use Random Access Channel, RACCH, signalling for SR info (i.e. SR=1).

In 202, it is resolved whether PDCCH is successfully decoded, 202.

If so, the method proceeds to 203, in which it is determined whether HARQ-ACK PUCCH info is present in a given slot. If yes, the method proceeds to 208, if no, the method awaits proceeding and returns to 202.

In step 203, it is investigated whether HARQ-ACK info, that is either HARQ-acknowledge or HARQ not-acknowledge, from the UE is prepared to be transmitted in a given slot.

If so, in 208, an SR is generated. SR=1 is set if pending data exists in the uplink buffer of the UE while SR=0 is set if no data exists. In this process, optionally more data flows for a UE may be used and the SR may optionally be generated by an OR function for the SR value of those respective flows.

In 209, the generated SR value is appended to the to the HARQ-ACK, info and the method subsequently proceeds to 207.

In 207, the UE transmits the HARQ-ACK info and SR info in HARQ-ACK PUCCH. No SR-PUCCH is transmitted.

Figure 2:
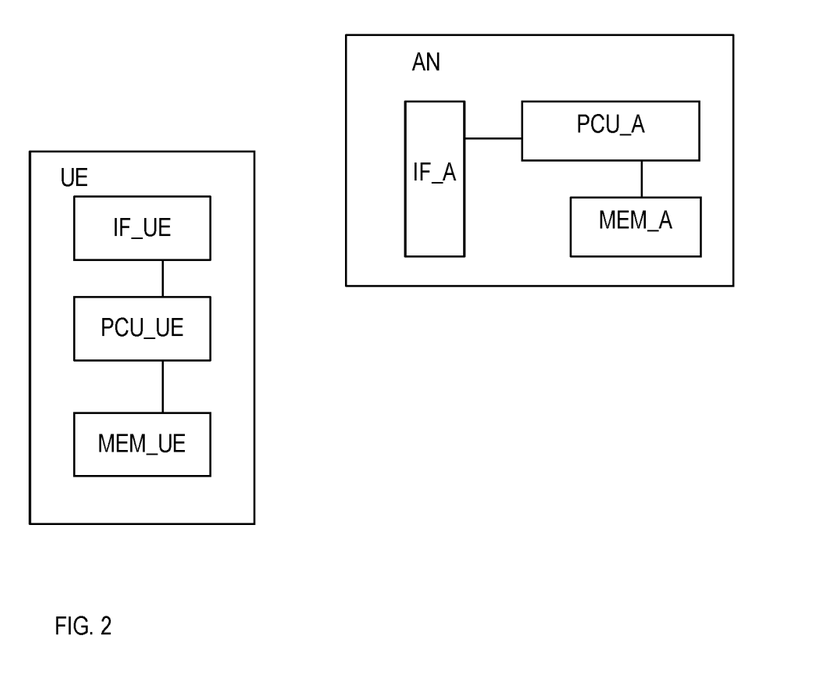
FIG. 2 shows exemplary apparatuses for realizing embodiments of the invention.

According to aspects of the invention, in FIG. 2, there is shown a user equipment, UE, apparatus according to the invention. The UE comprises a processor PCU_UE an interface IF_UE and a memory, MEM_UE, in which memory instructions are stored for carrying out the method steps explained above. The UE communicates via the interface IF_UE. The IF_UE comprises both an external interface, communicating with a transmitter and receiver, and internal interfaces (not shown).

There is also shown a radio access node AN, such as gNB, comprising a processor PCU_A, an interface IF_A; and a memory, MEM_A. Instructions are stored in the memory for being performed by the processor such that the method steps explained above are carried out and signalling is communicated on the interface.

The above apparatuses/entities are adapted to communicate over known external telecom interfaces or via application programming interfaces, API, as appropriate.

It is noted that the features of the methods described above, and in the following, may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-vol-atile memory, such as flash memory, or from another device via a suitable data interface, the described features may be implemented by hardwired circuitry instead of software or in combination with software.

To summarize the above embodiments there is provided:

A Method for a User Entity, UE, being adapted to transmit uplink data according to a NR Time Division Duplex, TDD, scheme, with a New Radio, NR, base station, gNB, the UE being further adapted to transmit a Hybrid Automatic Repeat Request-Acknowledgement, HARQ-ACK, information, being an acknowledge, ACK, or a not-acknowledge, NACK, for received data on a downlink channel and being adapted for transmitting a Scheduling Request, SR, comprising an indication of data or no data to be pending for transmittal on the uplink, the method comprising:

establishing 203 if HARQ-ACK info on HARQ-ACK PUCCH is available in a slot,
establishing if an SR-Physical Uplink Control Channel, SR-PUCCH, is present in the slot 204,
if no SR-PUCCH present in the slot, generating 208 a SR,
appending 209 the SR to the HARQ-ACK,
transmitting 211 the SR appended to the HARQ-ACK,
If a SR is present in the slot, the UE may be generating 208 a SR,
establishing 205 if the SR-PUCCH and the HARQ-ACK is overlapping in a given slot,
if not overlapping, generating 208 an SR,
appending 209 the SR to the HARQ-ACK,
transmitting 211 the SR appended to the HARQ-ACK.
If a SR and a HARQ-ACK is overlapping, the UE may be:
appending 206 the designated SR to the HARQ-ACK 209,
transmitting 207 the SR appended to the HARQ-ACK.
No SR-PUCCH may be transmitted when transmitting 207 the SR appended to the HARQ-ACK.

The above method, may further comprise:
establishing 202 if PDCCH is successfully decoded, and subsequently,
establishing 203 if HARQ-ACK info on HARQ-ACK PUCCH is available in a slot.

Respective logical data flows for a UE may be used such that:
generating the SR involves an OR function for respective SR values of said respective logical data flows.

The appended SR 209 may appear as an aperiodic SR, A SR, in the TDD scheme.

The UE may not have a periodic SR PUCCH resource configured.

Before possibly generating a SR 208, a further check may be performed of whether a SR request field, SR-REQ, is being set 220, and if so, proceeding to:
transmitting a HARQ-ACK PUCCH 218, while if not set, proceeding to generating the SR info of data flow 208.

The method may further comprise:
performing a check 222 on whether a downlink scheduling indicator is set and if so,
proceeding to transmitting 223 SR info in HARQ-ACK PUCCH, and if not set, proceeding,
appending 209 SR info to HARQ-ACK info.

Method may involve that the check 222 on whether a downlink scheduling indicator is set is performed after generating SR info 208.

There is further provided a method for a User Entity, UE, being adapted to transmit uplink data according to a NR Time Division Duplex, TDD, scheme, with a New Radio, NR, base station, gNB, the UE being further adapted to transmit Hybrid Automatic Repeat Request-Acknowledgement, HARQ-ACK, information, being an ACK or a NACK for received data on a downlink channel, in which the UE is not configured with Signalling request, SR,—Physical Uplink Control Channel, PUCCH, resources, the method comprising:
establishing 202 if PDCCH is successfully decoded, and subsequently,
establishing 203 if HARQ-ACK info on HARQ-ACK PUCCH is available in a slot,
generating 208 a SR,
appending 209 the SR to the HARQ-ACK,
transmitting 207 the SR appended to the HARQ-ACK.
No SR-PUCCH may be transmitted when transmitting 207 the SR appended to the HARQ-ACK.

Respective logical data flows for a UE is used and wherein:
generating the SR involves an OR function for respective SR values of said respective logical data flows.

According to an embodiment of the invention, the UE may comprise a processor PCU_UE an interface IF_UE and a memory, MEM_UE, in which memory instructions are stored for carrying out the method steps explained above. The UE communicates via the interface IF_UE.

The invention claimed is:

1. A method performed by a user entity (UE), the UE being adapted to transmit uplink data according to a New Radio (NR) Time Division Duplex (TDD) scheme, with a NR base station (gNB), the UE being further adapted to transmit a Hybrid Automatic Repeat Request Acknowledgement (HARQ-ACK) information, being an acknowledge (ACK) or a not-acknowledge (NACK) for received data on a downlink channel and being adapted for transmitting a Scheduling Request (SR) comprising an indication of data or no data to be pending for transmittal, the method comprising:
  establishing if Physical Downlink Control Channel for Downlink (PDCCH) is successfully decoded;
  establishing if HARQ-ACK information on HARQ-ACK Physical Uplink Control Channel (PUCCH) is available in a slot;
  establishing if an SR-Physical Uplink Control Channel (SR-PUCCH) is present in the slot, the SR-PUCCH being a periodical resource configured for sending SRs;
  if it is established that no SR-PUCCH is present in the slot, generating an SR;
  appending the SR to the HARQ-ACK information; and
  transmitting the SR appended to the HARQ-ACK information in HARQ-ACK PUCCH, wherein the appended SR appears as an aperiodic SR (AP SR) in the TDD scheme.

2. The method of claim 1, wherein SR-PUCCH is present in the slot, and the method further comprises:
  establishing if the SR-PUCCH and the HARQ-ACK PUCCH are overlapping in the given slot;
  if not overlapping, generating the SR;
  appending the SR to the HARQ-ACK; and
  transmitting the SR appended to the HARQ-ACK.

3. The method of claim 2, wherein the SR-PUCCH and the HARQ-ACK PUCCH are overlapping in the given slot, and the method further comprises:
  appending the designated SR to the HARQ-ACK,
  transmitting the SR appended to the HARQ-ACK.

4. The method of claim 1, wherein generating the SR comprises:
  using an OR function to combine a first SR for a first logical data flow with a second SR for a second logical data flow.

5. The method of claim 1, wherein the UE does not have a periodic SR PUCCH resource configured.

6. The method of claim 1, wherein a downlink scheduling indicator (DL-SCH) is provided on the PDCCH, and the method further comprises:
  performing a check on whether the downlink scheduling indicator is set;
  as a result of determining that the downlink scheduling indicator is set:
  appending the SR information to HARQ-ACK information; and
  transmitting the SR appended to the HARQ-ACK in HARQ-ACK PUCCH.

7. The method of claim 6, wherein the check on whether a downlink scheduling indicator is set is performed after generating SR information.

8. The method of claim 1, wherein a downlink scheduling indicator (DL-SCH) is provided on the PDCCH, and the method further comprises:
  performing a check on whether the downlink scheduling indicator is set;
  as a result of determining that the downlink scheduling indicator is not set:
  transmitting SR information only in HARQ-ACK PUCH,
  refraining from appending the SR information to HARQ-ACK information, and
  refraining from transmitting the SR appended to the HARQ-ACK in HARQ-ACK PUCCH.

9. A user entity (UE) being adapted to transmit uplink data according to a New Radio (NR) Time Division Duplex (TDD) scheme, with a NR base station (gNB), the UE being further adapted to transmit a Hybrid Automatic Repeat Request Acknowledgement (HARQ-ACK) information, being an acknowledge (ACK) or a not-acknowledge (NACK) for received data on a downlink channel and being adapted for transmitting a Scheduling Request (SR) comprising an indication of data or no data to be pending for transmittal, the UE comprising:
  memory; and
  processing circuitry coupled to the memory for causing the UE to perform a method comprising:
  establishing if Physical Downlink Control Channel for Downlink (PDCCH) is successfully decoded;
  establishing if HARQ-ACK information on HARQ-ACK Physical Uplink Control Channel (PUCCH) is available in a slot;
  establishing if an SR-Physical Uplink Control Channel (SR-PUCCH) is present in the slot, the SR-PUCCH being a periodical resource configured for sending scheduling requests (SR);
  if it is established that no SR-PUCCH is present in the slot, generating an SR;
  appending the SR to the HARQ-ACK information; and
  transmitting the SR appended to the HARQ-ACK information in HARQ-ACK PUCCH, whereby the appended SR appears as an aperiodic SR (AP SR) in the TDD scheme.

10. The UE of claim 9, wherein
  if SR-PUCCH is present in the slot, the UE is further configured to perform the additional steps of:
  establishing if the SR-PUCCH and the HARQ-ACK PUCCH are overlapping in the given slot,
  if not overlapping, generating the SR,
  appending the SR to the HARQ-ACK,
  transmitting the SR appended to the HARQ-ACK.

11. The UE of claim 9, wherein
  if the SR-PUCCH and the HARQ-ACK PUCCH are overlapping in the given slot, the UE is further configured to perform the additional steps of:
  appending the designated SR to the HARQ-ACK; and
  transmitting the SR appended to the HARQ-ACK.

12. The UE of claim 9, wherein generating the SR comprises:
  using an OR function to combine a first SR for a first logical data flow with a second SR for a second logical data flow.

13. The UE of claim 9, wherein the UE does not have a periodic SR PUCCH resource configured.

14. The UE of claim 9, wherein a downlink scheduling indicator (DL-SCH) is provided on the PDCCH, and the method further comprises:
  performing a check on whether the downlink scheduling indicator is set, wherein
  the UE is configured such that if the UE determines that the downlink scheduling indicator is set, the UE performs the steps of: appending the SR information to HARQ-ACK information and transmitting the SR appended to the HARQ-ACK in HARQ-ACK PUCCH, and
  the UE is configured such that if the UE determines that the downlink scheduling indicator is not set, the UE performs the steps of: transmitting SR information only in HARQ-ACK PUCH; refraining from appending the SR information to HARQ-ACK information; and refraining from transmitting the SR appended to the HARQ-ACK in HARQ-ACK PUCCH.

15. The method of claim 1, wherein generating the SR if it is established that no SR-PUCCH is present in the slot comprises setting SR equal to 1 as a result of determining that pending data exists in an uplink buffer of the UE.

16. The method of claim 1, wherein generating the SR if it is established that no SR-PUCCH is present in the slot comprises setting SR equal to 0 as a result of determining that no pending data exists in an uplink buffer of the UE.

17. A method performed by a user entity (UE), the method comprising:
 decoding a Physical Downlink Control Channel for Downlink (PDCCH);
 determining that Hybrid Automatic Repeat Request Acknowledgement (HARQ-ACK) information on HARQ-ACK Physical Uplink Control Channel (PUCCH) is available in a slot;
 determining whether a periodical resource configured for sending scheduling requests (SRs) is present in the slot;
 generating an SR as a result of determining that a periodical resource configured for sending SRs is not present in the slot;
 appending the generated SR to the HARQ-ACK information; and
 transmitting the HARQ-ACK information with the appended SR in HARQ-ACK PUCCH.

18. The method of claim 17, wherein generating the SR as a result of determining that a periodical resource configured for sending SRs is not present in the slot comprises setting SR equal to 1 as a result of determining that pending data exists in an uplink buffer of the UE.

19. The method of claim 17, wherein generating the SR as a result of determining that a periodical resource configured for sending SRs is not present in the slot comprises setting SR equal to 0 as a result of determining that no pending data exists in an uplink buffer of the UE.

* * * * *